Dec. 6, 1932.  J. SCHAUB  1,890,131
MACHINE FOR CUTTING OFF PIECES OF MATERIAL FROM
A STRIP AND CARRYING THEM FORWARD
Filed March 7, 1928  5 Sheets-Sheet 5

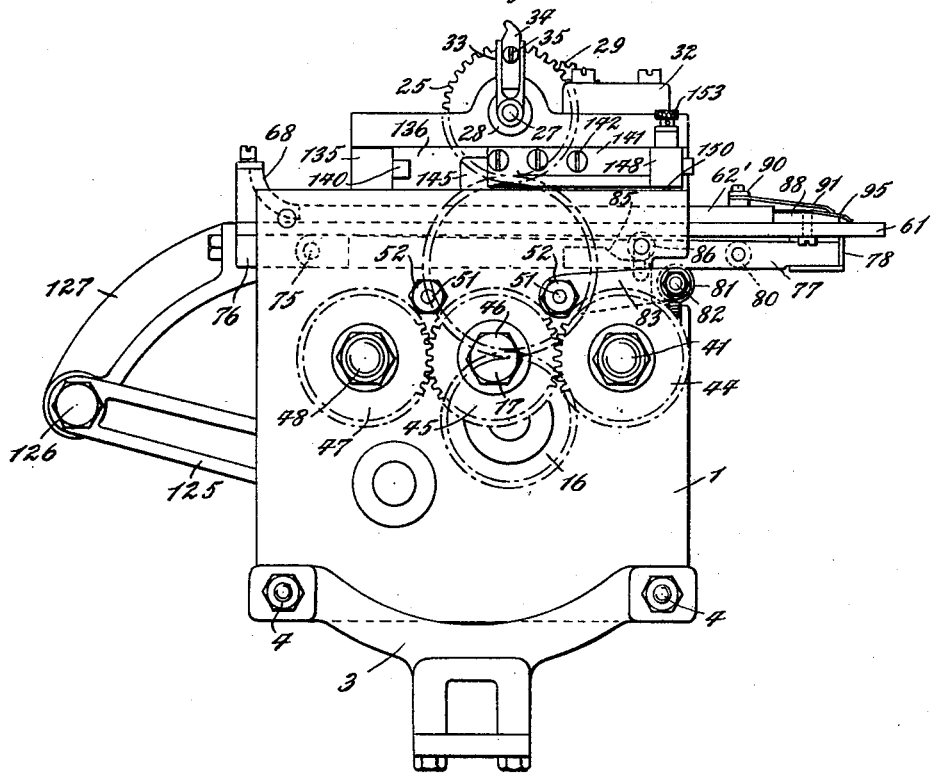

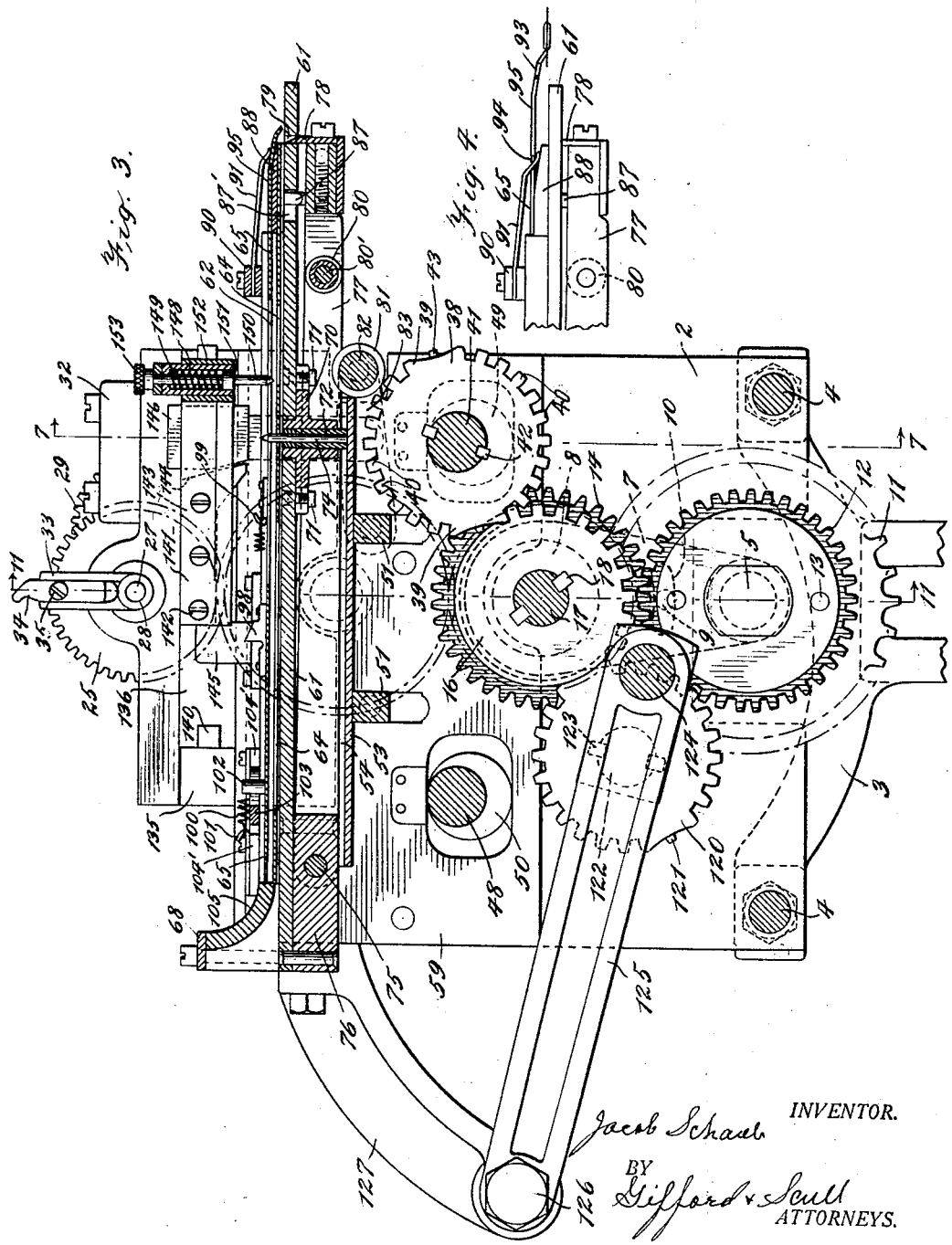

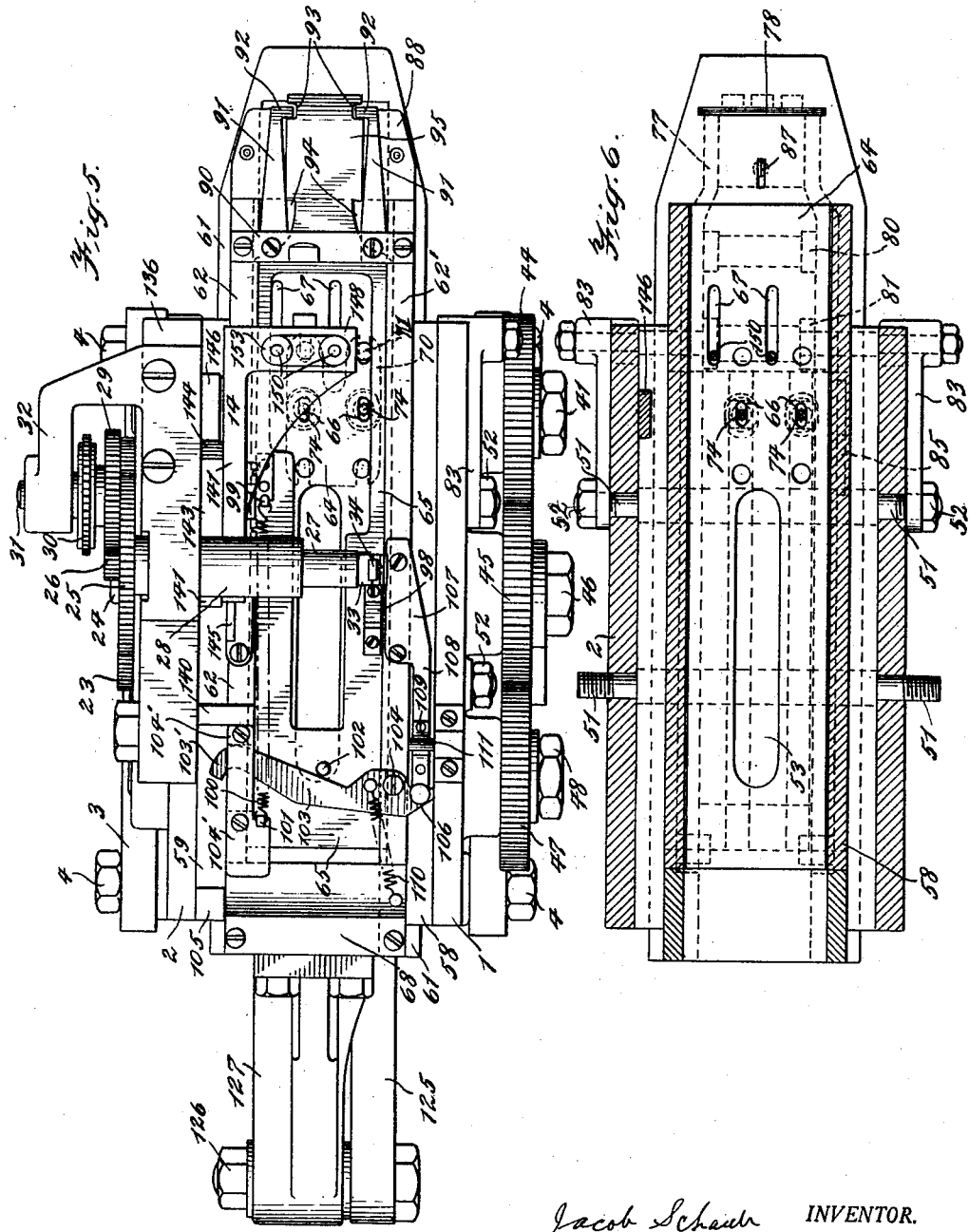

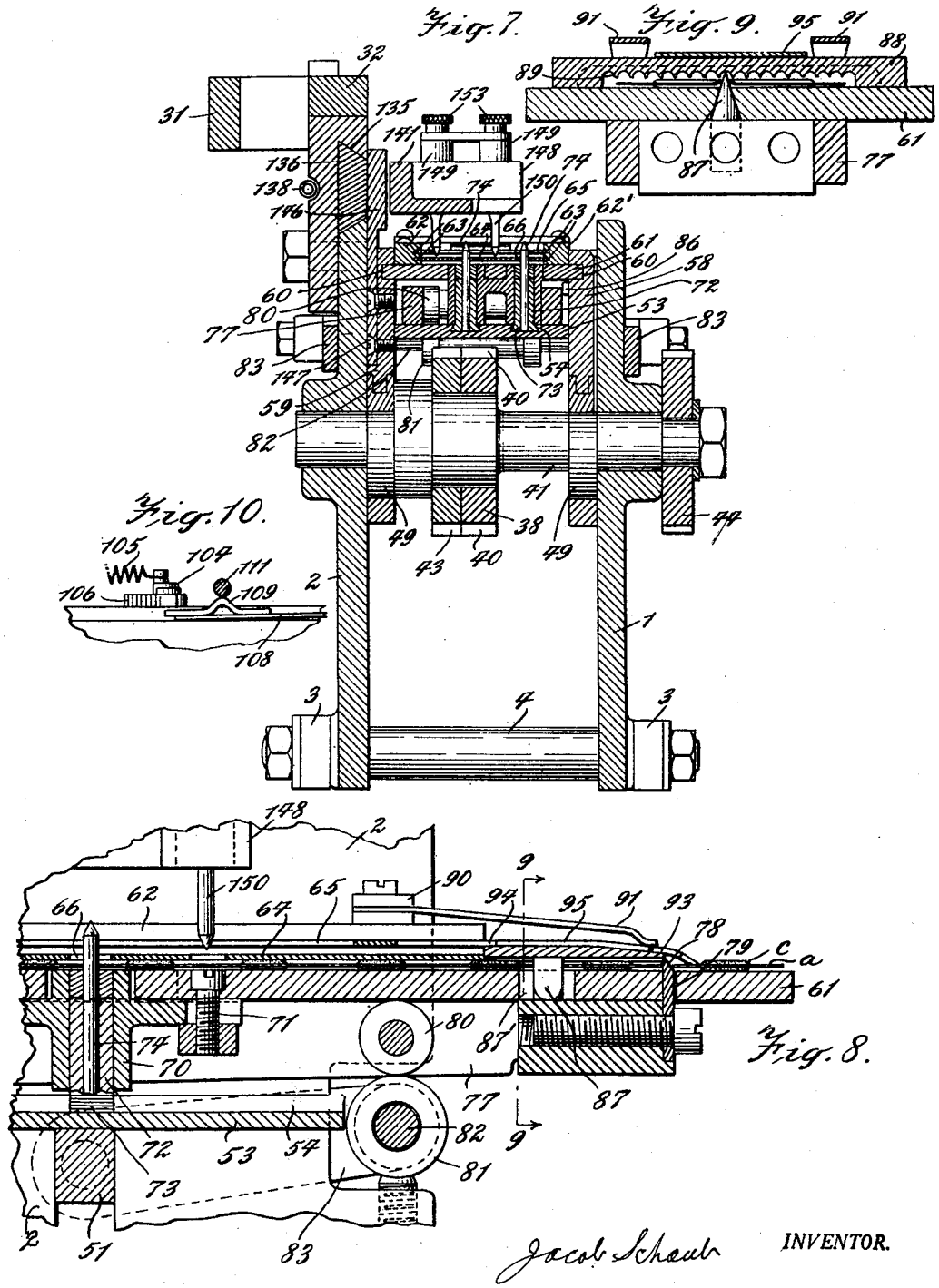

Jacob Schaub INVENTOR.
BY
Gifford & Scull ATTORNEYS.

Patented Dec. 6, 1932

1,890,131

UNITED STATES PATENT OFFICE

JACOB SCHAUB, OF WESTFIELD, NEW JERSEY, ASSIGNOR TO BEST FOODS, INC., OF NEW YORK, N. Y., A CORPORATION OF NEW JERSEY

MACHINE FOR CUTTING OFF PIECES OF MATERIAL FROM A STRIP AND CARRYING THEM FORWARD

Application filed March 7, 1928. Serial No. 259,706.

This invention relates to a machine for advancing a strip of material and cutting pieces off of the same and carrying the pieces forward after they have been cut off. The invention is especially adapted for cutting off wafers from a strip containing batches of coloring material for oleomargarine and inserting the wafers into the packages of oleomargarine while they are being wrapped, but it is to be understood that the invention is not restricted to this particular use. The strip of material is fed into the machine and wafers all of the same size can be cut off and inserted in the packages.

In carrying out the invention, a strip carrying the supply of coloring material is first formed and is fed into the machine and the wafers cut off at the desired rate and the cut-off pieces are inserted in such a manner that the packages are not interfered with. The wafers are gripped securely while being cut and inserted and are turned loose when they reach the proper positions.

Figure 11:
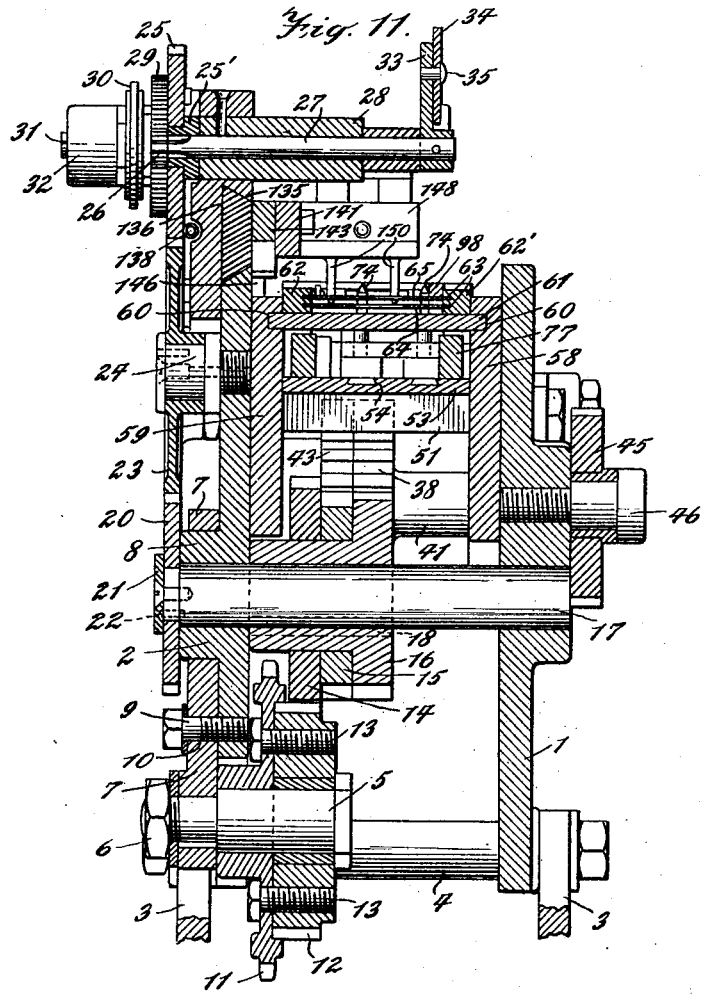
Figure 12:
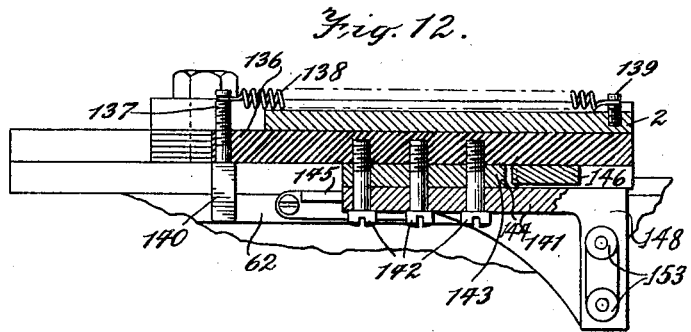

The invention will be understood from the description in connection with the accompanying drawings, in which Fig. 1 is a side elevation of an illustrative embodiment of the invention; Fig. 2 is a plan view of the strip of material from which pieces are to be cut; Fig. 2$^a$ is a sectional view along the line 2$a$—2$a$ of Fig. 2; Fig. 3 is a longitudinal sectional elevation of the device; Fig. 4 is a side view showing some of the details; Fig. 5 is a plan view; Fig. 6 is a horizontal section through the device; Fig. 7 is a section along the line 7—7 of Fig. 3; Fig. 8 is a vertical section on an enlarged scale showing some of the details; Fig. 9 is a section showing some of the details; Fig. 10 is a side view, partly broken away, showing some of the details; Fig. 11 is a section along the line 11—11 of Fig. 3, and Fig. 12 is a plan view, partly in section, showing some of the details.

A strip of material is shown in Figs. 2 and 2$^a$ that can be conveniently cut in pieces and the individual pieces moved forward by this machine. The strip $a$ comprises a number of wafers between which wafers rows of equally spaced transverse holes $b$ are provided. Each wafer consists of a supply or batch of powdered coloring matter that has been enclosed in the pockets $c$ and sealed to prevent access of moisture.

In the drawings, reference characters 1 and 2 indicate parallel plates spaced apart forming the sides of the device. The sides 1 and 2 are connected to brackets 3 by means of transverse bolts 4 so that the device can be attached to a convenient support.

A stud shaft 5 (Figs. 3 and 11) is connected by means of a nut 6 to a swinging arm 7 that is pivoted on a boss 8 on the outside of the side 2. The swinging arm 7 is provided with an arcuate slot 10 through which a bolt 9 passes for clamping the arm in adjusted positions. A sprocket 11, driven from any convenient source of power, is mounted on the shaft 5 and a gear 12 is connected to the sprocket 11 by means of bolts 13. A gear 14 meshes with the gear 12 and is attached to a booster gear 15 and an interrupted gear 16, the latter being keyed to the shaft 17 by means of the key 18, the shaft 17 having bearings in the sides 1 and 2.

A gear 20 on the outside of the side 2 is attached to the shaft 17 by means of the retaining member 21 and pin 22. The gear 20 meshes with a gear 23 that is mounted on a stud shaft 24 attached to the side 2, and this gear meshes with a gear 25 that is attached to a collar or sleeve 25' which is, in turn, fastened on a shaft 27 that revolves in a long bearing 28. The projecting end of the shaft 27 carries a pinion 26 that meshes with a gear 29 to which the sprocket 30 is attached by being mounted on the shaft 31 therewith. The shaft 31 is mounted in bearings on a bracket or support 32. A chain, not shown, may pass from the sprocket 30 to a sprocket on a reel for unwinding a roll of the material to be fed to the machine, or the strip of material may be passed to the machine in any other convenient manner. The gear 29 and sprocket 30 do not constitute a part of this invention and they will not be further described.

The other end of the shaft 27 has an arm 33 fastened thereto and a slidable finger 34 is attached to the arm 33 by means of the set screw 35 so that the same can be adjusted.

The interrupted gear 16 meshes with a gear 38 that has two rest or dwell portions 39 and two series of teeth 40 so that the gear 38 will be driven intermittently a half revolution for each revolution of the gear 16. The gear 38 is keyed to the shaft 41 by means of the keys 42, this shaft having bearings in the sides 1 and 2 (Figs. 3 and 7). A gear having two teeth 43 in alignment with the central portions of the dwell portions 39 of the gear 38 is also keyed to the shaft 41 by means of the keys 42, and the teeth 43 of this gear are struck by teeth on the booster gear 15 to start the gear 38 from a rest or dwell position. A gear 44 (Figs. 5 and 7) is keyed to the shaft 41 on the outside of the side 1 and meshes with an intermediate gear 45 on the stud shaft 46 that is attached to the side 1. A gear 47 meshes with the gear 45 and is keyed to the shaft 48 (Figs. 3 and 5) which has bearings in the sides 1 and 2. Pairs of cams 49 and 50 (Figs. 3 and 7) are formed on the shafts 41 and 48 for a purpose to be described below.

Fixed cross bars 51 extend through the sides 1 and 2 perpendicular to the same and are held in place by means of the nuts 52 on the outside of the sides. A horizontally disposed plate 53 is attached to the bars 51 between the sides 1 and 2 (Figs. 3, 6, 8 and 11). The upper side of the plate 53 is provided with parallel longitudinal dovetail grooves 54.

A vertically movable frame having side plates 58 and 59 is located between the sides 1 and 2. The inside of each side plate 58 and 59 is provided with a groove 60 (Figs. 7 and 11) to accommodate the edges of a horizontally slidable carrier plate 61 which may be called a carriage. Side guide bars 62 and 62' that are parallel to each other are mounted upon the upper side of the plate 61 and their edges contact with the insides of the side plates 58 and 59. Each of the bars 62 and 62' is provided on its inner edge with a pair of long grooves 63. A guide plate 64 is located with its edges in the lower grooves 63 and a pusher plate 65 is located with its edges in the upper grooves 63. The lower guide plate 64 is provided with holes 66 for pins and the middle portion of the pusher plate 65 is cut away. The plate 64 is also provided with longitudinal slots 67 for pins to reciprocate therein, as will be described below. A curved guide 68 (Figs. 3 and 5) is provided above the front end of the plate 61 for the entrance of the strip that is to be cut. A guide member 70 for pins is adjustably attached to the lower side of the plate 61 by means of screws 71 that pass through slots in the guide member. The guide member 70 is provided with bosses in which sleeves 72 are mounted having their lower ends flaring outwardly, as shown at 73, to fit into the grooves 54 in the plate 53, so that they can be moved longitudinally along these grooves without moving away from the plate 53. Pins 74 are provided in the sleeves 72 and their upper ends project above the upper ends of the sleeves 72.

Pivots 75 (Figs. 1 and 3) are attached to a block 76 fastened to the lower side of the front end of the plate 61 and knife bars 77 have one end of each pivoted to the pivots 75. A transverse knife blade 78 is attached to the other ends of the knife bars 77 and is adapted to be forced through a slot 79 in the plate 61 (Figs. 3 and 8). A roller 80 is mounted on a shaft 80' extending between the bars 77, and a stationary adjustable roller 81 is mounted on a shaft 82 that is attached to the side members 83 which are pivoted on the sides 1 and 2 so that, when the roller 80 passes over the roller 81 horizontally, the bars 77 will be lifted and cause the knife 78 to pass through the slot 79. A retrieving cam 85 (Figs. 1 and 6) may be placed upon one of the bars 77 to be struck by the stationary stop 86 mounted on the side plate 58, so that the knife will not become stuck in its upward position. A slitter 87 (Figs. 3, 4, 8 and 9) is attached to the cross piece upon which the knife 78 is mounted and is adapted to pass through the opening 87' in the plate 61. A shearing block 88 (Figs. 1, 3 and 9) is mounted on the upper side of the plate 61 for the knife 78 and its underside is provided with longitudinal ribs 89 to facilitate the cutting operation. The front top side of the shearing block 88 is made sloping and the extending end of the pusher plate 65 slides along the top side of this sloping surface.

A cross bar 90 (Figs. 1, 3 and 5) is connected along the upper sides of the rear ends of the bars 62 and 62'. The cross bar 90 carries spring fingers 91 for pressing the spring end of the pusher plate 65 downwardly to clamp the cut-off pieces. The spring fingers 91 are provided with inwardly projecting ends 92 that pass through pairs of notches 93 and 94 on the extending end 95 of the pusher plate 65.

A lug 98 (Figs. 3 and 5) is attached to the upper side of the pusher plate 65 in such a position as to be contacted by the finger 34 on the arm 33 at intervals. A hook 99 is also provided upon the upper side of the pusher plate 65 and a tension spring 100 connects this hook to the hook 101 on the guide bar 62. A stop pin 102 is also mounted upon the upper side of the pusher plate 65. A lever 103 is pivoted near one of its ends to the pivot 104 on the side bar 62', the other end of the lever extending beyond the side bar 62 between stops 104' as shown at 103'. A lug 105 is located at the end of the upper edge of the side plate 59 and the projecting end of the lever 103 comes into contact with the same in certain positions. The lever 103 has an extension 106 extending above the upper edge of the side plate 58. A plate 107 is attached to the corresponding guide bar 62′ and carries a spring arm 108 upon the upper side of which a cam 109 is mounted. A tension spring 110 connects the lever 103 to the carrier plate 61 or guide 68. A pin stop or cam-operating device 111 is mounted on the top edge of the side 1.

An interrupted gear 120 (Fig. 3) similar to the gear 38 is attached to a gear having teeth 121 similar to the gear having teeth 43. The gear 120 meshes with the interrupted gear 16. The gear 120 is keyed to the shaft 122 by means of the keys 123, this shaft having bearings in the sides 1 and 2. The gear 120 carries a crank pin 124 to which a crank rod 125 is connected. The other end of the crank rod 125 is connected to the pivot pin 126 on the bracket arm 127 that is, in turn, attached to the block 76 or plate 61.

A dove-tail groove 135 (Figs. 3, 7, 11 and 12) is provided in an extension of the upper edge of the side 2 and a horizontally sliding bar 136 is mounted in this groove. The bar 136 carries a pin 137, to which one end of a tension spring 138 is attached. The other end of the spring 138 is attached to a pin 139 fixed to the side 2. A lug 140 projects from the bar 136 on the other side thereof from the pin 137 and may be made an integral part of this pin. An L-shaped bracket 141 is attached to the bar 136 by means of screws 142 with a spacing member 143 between the bracket 141 and bar 136. One end of the spacing member 143 is made sloping as indicated at 144 (Fig. 3) for a purpose to be described.

A dog 145 (Figs. 1, 3, 5 and 12) is attached to the guide bar 62 between the lug 140 and the end of the bracket 141. A stop 146 is attached to the side plate 59 by means of screws 147 and has one edge of its upper end sloping corresponding to the edge of the member 143. The short arm 148 of the L-shaped bracket 141 is made in the form of a housing for the sleeves 149 (Figs. 1, 3, 5, 7, 8 and 11). Pins 150 extend through the sleeves 149 (Fig. 3) and are provided with collars 151. Compression springs 152 are located between the collars 151 and the upper ends of the sleeves 149 to keep the pins 150 in their lower positions. The pins 150 are provided with knurled heads 153 so that the same can be lifted when desired and will be returned to position by the springs 152.

The operation is as follows: It will be assumed to start that a strip of material has been fed into the machine and a piece or wafer c cut off, as shown in Fig. 8. At that moment, the parts are in the position shown in Fig. 3, that is, in the most advanced forward position of the plate 61 and the carriage. Further movement of the sprocket 11 will cause the gear 12 to drive the gears 14, 15 and 16 in a counterclockwise direction (Fig. 3), thus causing the gear 38 to be turned a half revolution clockwise. Gears 44, 45 and 47 (Fig. 5) are driven at the same time, so that the shafts 41 and 48 will be turned half of a revolution, thus causing the cams 49 and 50 to revolve to their uppermost position and carry the side plates 58 and 59 to their highest position. This causes the strip of material that is being cut to move upwardly a sufficient distance to withdraw the pins 74 from the holes b in the material, since the pins 74 cannot move upwardly because their enlarged ends can only slide back and forth in the dove-tail grooves in the fixed plate 53. The upward movement of the carriage, etc. by the cams 49 and 50 causes the pins 150 to extend into holes b in the strip ahead of the holes from which the pins 74 were withdrawn. On account of the fact that the crank pin 124 is stationary during this time and the crank arm 125 revolves slightly around the same as a pivot, the side plates 58, 59 and plate 61 will be carried a slight distance to the right (Fig. 3) during its upward movement. In order for the pins 150 to keep in alignment with the holes in the strip during this upward movement of the parts, the stop 146 slides along the sloping portion 144 and permits the sliding bar 136 carrying the bracket 141 and pins 150 to move in accordance with the motion of the plate 61. This upward motion at a slight angle to the vertical is advantageous as the projecting end of the plate 61 is thereby caused to move upwardly and slightly forwardly simultaneously, thus making it less likely to disturb or lift the package to which the cut-off piece is carried. The gear 25 turns twice for each complete revolution of the shafts 41 and 48 and after the side plates 58 and 59 have been raised to their uppermost position as thus described, the finger 34 strikes the lug 98 on the pusher plate 65, thus advancing it and causing the extending end 95 thereof to move forward and carry the cut-off wafer c into the package which has been brought into proximity to the end of the plate 61. The successive packages, such as oleomargarine, for example, into which the wafers are inserted may be advanced into place automatically by a device that forms no part of the present invention and the wafers are left in the packages. The wafers are turned loose when the pusher plate 65 has been advanced to its extreme position because the notches 94 reach the projecting ends 92 of the spring fingers 91 and the end 95 consequently springs upwardly a short distance and turns the wafers loose. At this instant, the arm 33 has passed to such a position that the finger 34 disengages from the lug 98 and the spring 100 snaps the pusher plate 65 back to its farthermost position to the left until its end strikes the guide member 68 and stops it. During this movement of the pusher plate 65, the projecting ends 92 move along the lower side of the extension 95 until they reach the notches 93. The next forward movement of the pusher plate 65 will cause the fingers 91 to ride upon the upper side of the extension 95, as will be clear from an inspection of Figs. 5 and 8, thus pressing the extension 95 downwardly to again clamp the strip or cut-off portion thereof.

After the pusher plate 65 is snapped back to its extreme position with its extension 95 lifted off of the plate 61, the gear 16 turns the gear 120 half of a revolution, thus causing the crank rod 125 to pull the side plates 58 and 59 and carriage to the extreme left-hand position. During this movement, the strip and side plates 58 and 59 are still in their highest position, so that the pins 74 do not project into the holes in the strip but the pins 150 are in their holes. During the first one-third of the return motion, the strip of material is held stationary by the pins 150, so that the next row of holes therein will be in position to be entered by the pins 74 when the strip is lowered over these pins. When that much of the return position has been finished, the dog 145 on the bar 62 strikes the lug 140, thus carrying the sliding bar 136 back through the remaining distance that the plate 61 is moved. When the plate 61 has almost reached the extent of its return movement, the projecting end 103' of the lever 103 strikes the stationary lug 105 and is turned slightly in a clockwise direction, as seen in Fig. 5. This causes the lever 103 to press against the pin 102 and move the pusher plate 65 a sufficient distance to the right to cause the extensions 92 on the spring arms 91 to ride a sufficient distance upon the upper side of the extension 95 to press the end of the same into contact with the strip, pressing the end of the same against the strip on the plate 61. The movement of the lever 103 carries its extended end 106 beyond the end of the spring 108, so that, as soon as this spring rises to its upper position, the end thereof will lock the lever 103 in the position shown in Fig. 5.

The next movement is caused by the gear 16 again turning the shafts 41 and 48 a half revolution, thus bringing the cams 49 and 50 to the lowermost position shown in Fig. 3, thus causing the side plates 58 and 59 and the strip of material to descend. During this movement, the cam 109 leaves the pin 111 (Fig. 10) so that the spring arm 108 rises behind the extending end 106 and locks the lever 103 in position with the pusher plate 65 slightly advanced, as above explained. Also during this motion or lowering of the parts, the crank pin 124 is stationary, so that there will be a slight longitudinal motion of the plate 61 while it is descending. For that reason, the left-hand edge of the stop 146 (Fig. 3) is made sloping so that it will push the sliding bar 136 that carries the bracket and housing for the pins 150 slightly to the left to compensate for the slight longitudinal movement of the plate 61, so that the pins 150 will kept in alignment with the holes in the strip that they are to enter.

The next movement is caused by the gear 16 turning the gear 120 a half revolution to the position shown in Fig. 3, thus carrying the side plates 58, 59 and plate 61 to the right and lowermost position shown in Fig. 3. During this movement, the roller 80 passes over the roller 81, thereby causing the knife bars 77 to be lifted and carrying the knife 78 through the slot 79 and cutting off a piece or wafer, which cut-off piece or wafer will still be clamped against the plate 61 by the extension 95. At the same time, the slitter 87 is projected through the hole 87' in the plate 61 and slits the strip slightly, so that an initial slit is provided in each wafer to facilitate ease of tearing the same open when it is desired to use it. The pins 74 extending through holes in the strip $a$ will, of course, cause the strip to be carried forward with the plate 61.

It will be remembered that the spring arm 108 has already locked the lever 103 so that the pusher plate 65 is in a slightly advanced position, thus causing the spring fingers 91 to keep the front extension 95 pressed downwardly against the strip of material. When the side plates 58 and 59 are raised to the point where the stop 111 unlocks the lever 103, the finger 34 striking the lug 98, prevents the spring 100 from pulling the pusher plate 65 backwards to turn the piece loose until after it has been projected into its furthermost forward position. It will also be remembered that during the time the pins 150 are keeping the strip $a$ stationary while the plate 61 is moving back, the end of the extension 95 is raised a slight distance from the plate 61, so that the strip can move forward with respect to the plate 61 preparatory to having the pins 74 enter the next row of holes in the strip $a$. The pins 150 can be raised by means of the knurled heads against the pressure of the springs 152 while the plate 61 is in its elevated position, so that the strip $a$ can be inserted and the pins 150 then permitted to enter a row of holes $b$ preparatory to beginning the operation.

I claim:

1. In a machine of the character described, means comprising a reciprocating feeding member for moving a strip of material forwardly intermittently and cutting pieces off of it, and a pusher connected to said strip moving means for pushing the pieces forwardly after they have been cut off.

2. In a machine of the character described, means comprising a reciprocating feeding member for moving a strip of material forwardly intermittently and cutting pieces off of it, and a pusher connected to said strip moving means for projecting the pieces forwardly and upwardly after they have been cut off.

3. In a machine of the character described, means comprising a reciprocating feeding member for moving a strip of material forwardly intermittently, clamping it each time after it moves forward, and cutting pieces off of it, and a pusher connected to said strip moving means for pushing the pieces forwardly after they have been cut off.

4. In a machine of the character described, means comprising a reciprocating feeding member for moving a strip of material forwardly intermittently, and cutting pieces off of it, said means comprising a movable knife, and a pusher connected to said strip moving means for pushing the pieces forwardly after they have been cut off.

5. In a machine of the character described, means for moving a strip of material forwardly intermittently and cutting pieces off of it, said moving means comprising a reciprocating carriage, and means connected to and timed with said strip moving means for pushing the pieces forwardly after they have been cut off.

6. In a machine of the character described, means for moving a strip of material forwardly intermittently and cutting pieces off of it, said moving means comprising a horizontally and vertically moving carriage, and a pusher connected to said strip moving means for projecting the pieces forwardly after they have been cut off.

7. In a machine of the character described, means for moving a strip of material forwardly intermittently and cutting pieces off of it, means for supporting said pieces, and means timed with said strip moving means for projecting the pieces forwardly after they have been cut off, said last named means comprising a slidable pusher.

8. In a machine of the character described, means for moving a strip of material forwardly intermittently and cutting pieces off of it, and means for projecting the pieces forwardly after they have been cut off, said last named means comprising a slidable pusher and means for moving it independently of the strip moving means.

9. In a machine of the character described, reciprocating means for moving a strip of material forwardly intermittently, means for cutting pieces off of it, means for projecting the pieces forwardly after they have been cut off, and means to hold said strip while said first named means is moving backwards.

10. In a machine of the character described, reciprocating means for moving a strip of material forwardly intermittently, means for cutting pieces off of it, means for projecting the pieces forwardly after they have been cut off, and means to hold said strip while said first named means is moving backwards, said holding means being movable within limits parallel to said strips.

11. In a machine for cutting pieces off of a strip of material having equally spaced holes in a direction longitudinally of said strip, pins on opposite sides of said strip to enter said holes, means to cause a set of pins to enter holes and move said strip forwardly, means to cut a piece off of said strip each time it is moved forwards and reciprocating means to cause a set of pins to enter holes and prevent said strip from moving backwards.

12. In a machine for cutting pieces off of a strip of material having equally spaced holes in a direction longitudinally of said strip, pins on opposite sides of said strip to enter said holes, reciprocating means to cause pins on opposite sides of said strip to enter holes alternately and move said strip forwardly intermittently, and means to cut a piece off of said strip each time it is moved forwards.

13. In a machine for cutting pieces off of a strip of material having equally spaced holes in a direction longitudinally of said strip, pins on opposite sides of said strip to enter said holes, reciprocating means to cause a set of pins to enter holes and move said strip forwardly, means to cut a piece off of said strip each time it is moved forwards and means to cause a set of pins to enter holes and prevent said strip from moving backwards, one of said sets of pins being spring held in position.

14. In a machine for cutting pieces off of a strip of material having equally spaced holes in a direction longitudinally of said strip, sets of pins on opposite sides of said strip to enter said holes, and means to cause the set of pins on one side of said strip to enter the holes alternately and move said strip forwardly intermittently, means to cut a piece off of said strip each time it is moved forwards, the pins on one side of said strip being movable longitudinally of said strip a greater distance than those on the other side.

15. In a machine for cutting pieces off of a strip of material having equally spaced holes in a direction longitudinal of said strip, pins on opposite sides of said strip to enter said holes, means to reciprocate said strip longitudinally of said pins, means to move some of said pins longitudinally of said strip, and means to cut a piece off of said strip each time it is moved in one direction.

16. In a machine for cutting pieces off of a strip of material having equally spaced holes in a direction longitudinally of said strip, pins on opposite sides of said strip to enter said holes, reciprocating means to cause a set of pins to enter holes and move said strip forwardly, means to cause a set of pins to enter holes and prevent said strip from moving backwards, and means to cut pieces off of said strip.

17. In a machine for cutting pieces off of a strip of material having equally spaced holes in a direction longitudinally of said strip, pins on opposite sides of said strip to enter said holes, reciprocating means to cause a set of pins to enter holes and move said strip forwardly, means to cause a set of pins to enter holes and prevent said strip from moving backwards, and means to cut pieces off of said strip and move the pieces forward independently of said strip.

18. In a machine for cutting pieces off of a strip of material having equally spaced holes in a direction longitudinally of said strip, pins on opposite sides of said strip to enter said holes, reciprocating means to cause a set of pins to enter holes and move said strip forwardly, means to cause a set of pins to enter holes and prevent said strip from moving backwards, and means to cut pieces off of said strip and move the pieces forward and upwardly independently of said strip.

19. In a device of the character described, a carriage movable longitudinally and transversely, means cooperating with said carriage to feed a strip of material, means to cut said strip off at intervals, and a slidable pusher on said carriage cooperating with said cut-off portions.

20. In a device of the character described, a carriage movable longitudinally and transversely, means cooperating with said carriage to feed a strip of material, a knife to sever said strip, and a pusher movable along said carriage to cooperate with said cut-off portions.

21. In a device of the character described, a carriage movable longitudinally and transversely, means cooperating with said carriage to feed a strip of material, a knife to sever said strip, a pusher movable along said carriage, and means to raise the end of said pusher while said strip is being fed.

22. In a device of the character described, a carriage movable longitudinally and transversely, means cooperating with said carriage to feed a strip of material, a knife to sever said strip, a pusher movable along said carriage, and means to raise the end of said pusher while said strip is being fed and to cause the end of said pusher to contact with said strip before it is severed.

23. In a device of the character described, a carriage, cams to raise said carriage, a crank pin and connection to reciprocate said carriage, means cooperating with said carriage to feed a strip of material, and means timed with said reciprocating carriage to sever said strip at intervals.

24. In a device of the character described, a carriage, cams to raise said carriage, a crank pin and connection to reciprocate said carriage, means cooperating with said carriage to feed a strip of material, and means timed with said reciprocating carriage, to sever said strip at intervals, said crank pin being located so that said carriage moves slightly longitudinally as it is being raised.

25. In a device of the character described, a carriage, cams to raise said carriage, a crank pin and connection to reciprocate said carriage, means cooperating with said carriage to feed a strip of material and means timed with said reciprocating carriage to sever said strip at intervals, said cams and crank pin being geared together.

26. In a device of the character described, a carriage, cams to raise said carriage, a crank pin and connection to reciprocate said carriage, means cooperating with said carriage to feed a strip of material, means timed with said reciprocating carriage to sever said strip at intervals, and a slidable member movable longitudinally by said carriage a portion of the distance said carriage moves.

JACOB SCHAUB.